Aug. 9, 1960   E. G. CASADY   2,948,085
PIPE INSULATION CUTTING MACHINE
Filed April 1, 1959   5 Sheets-Sheet 1

INVENTOR.
EDGAR G. CASADY
BY
Salvatore G. Militara
ATTORNEY

Aug. 9, 1960   E. G. CASADY   2,948,085
PIPE INSULATION CUTTING MACHINE
Filed April 1, 1959   5 Sheets-Sheet 2

INVENTOR.
EDGAR G. CASADY
BY
Salvatore G. Militara,
ATTORNEY

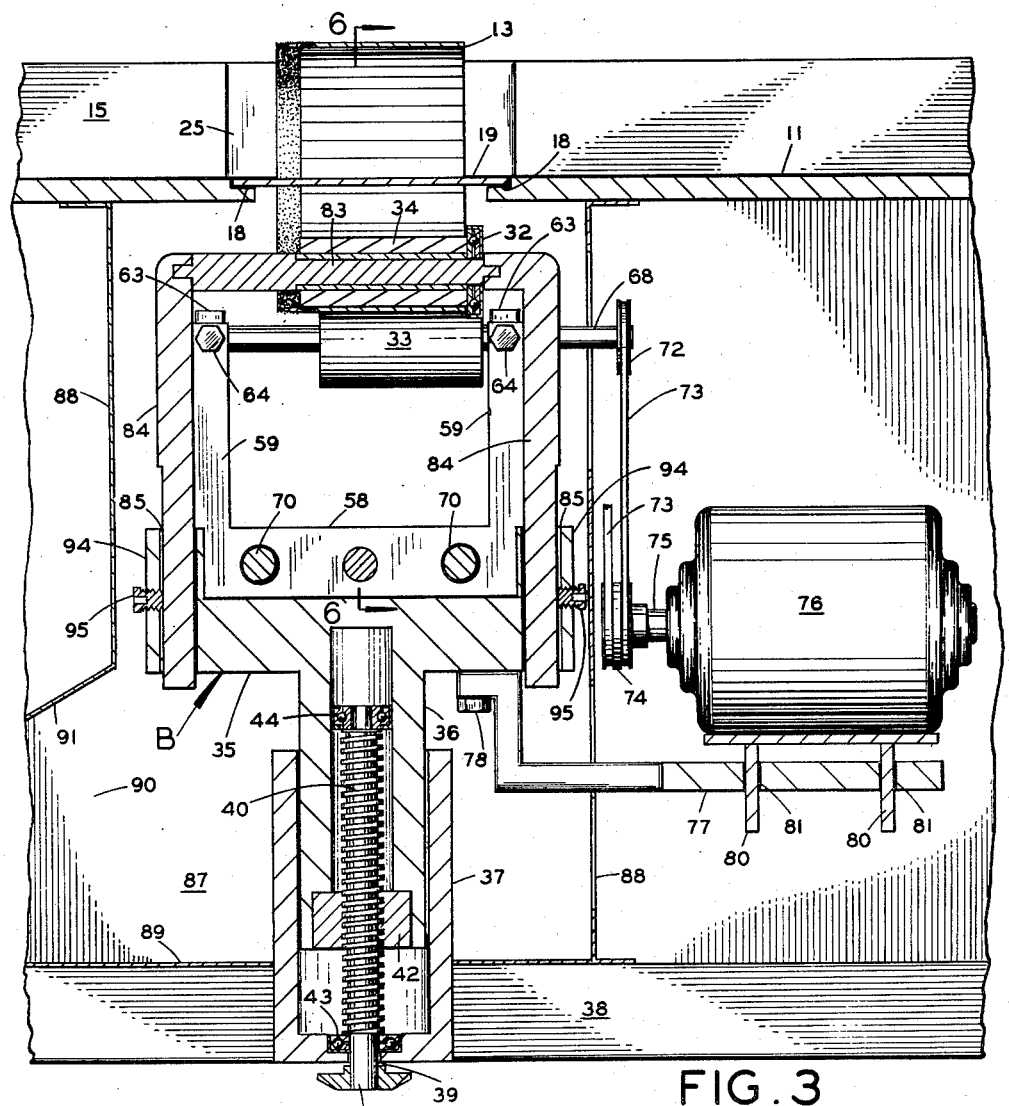
FIG. 3
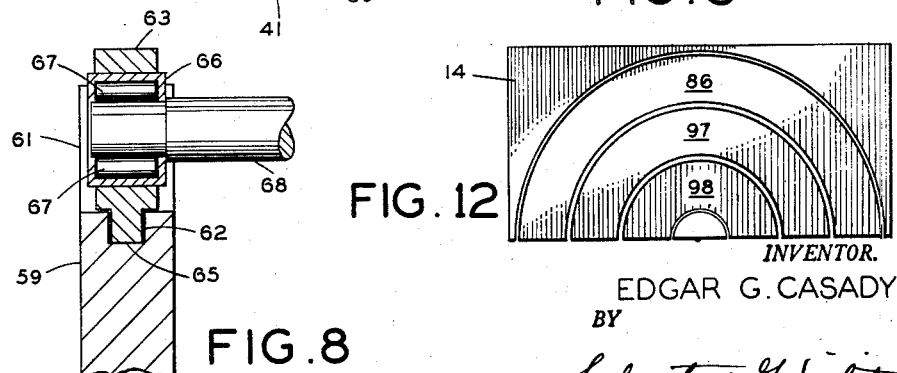
FIG. 8
FIG. 12
INVENTOR.
EDGAR G. CASADY
BY
ATTORNEY

United States Patent Office 2,948,085
Patented Aug. 9, 1960

2,948,085

PIPE INSULATION CUTTING MACHINE

Edgar G. Casady, 2355 SW. 18th Ave.,
Fort Lauderdale, Fla.

Filed Apr. 1, 1959, Ser. No. 803,525

5 Claims. (Cl. 51—74)

This invention relates generally to cutting machines and is more particularly directed to a pipe insulation cutting machine.

A principal object of the present invention is to provide a pipe insulation cutting machine which permits the production of pipe insulation with the greatest of efficiency reducing to an absolute minimum the waste caused by ground or abraded insulation material and by breakage due to the manner by which the pipe insulation is cut.

A further object of the present invention is to provide a pipe insulation cutting machine which cuts pipe insulation from blocks of insulation material of any length with ease and very readily thereby reducing the cost of production greatly of pipe insulation by the conventional machines now in use.

Another object of the present invention is to provide a portable pipe insulation cutting machine which is readily adapted to job site conditions.

Another object of the present invention is to provide a pipe insulation cutting machine wherein a new cutter of appropriate size may be installed and the necessary adjustment made very quickly to produce pipe insulation of any desired size in any quantities, large or small at a relatively low labor cost.

A still further object of the present invention is to provide a pipe insulation cutting machine with a hollow cylindrical cutter having a removable cutting tip whereby the cutting tips may be readily replaced as their cutting edges become worn or dull and also permits the use of cutting tips of various types so that the machine becomes capable of cutting insulation block composed of all kinds of material such as foamglass, star foam, fiberglass and other plastics and all kinds of cork, kalo and the like.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 3 is a vertical sectional view taken along the line 3—3 of Figure 2.

Figure 8 is a detailed sectional view taken along the line 8—8 of Figure 4.

Figure 12 shows the manner by which a single cylindrical block of insulation is cut with a minimum of waste by my machine into pipe covering of different sizes.

Figure 1:
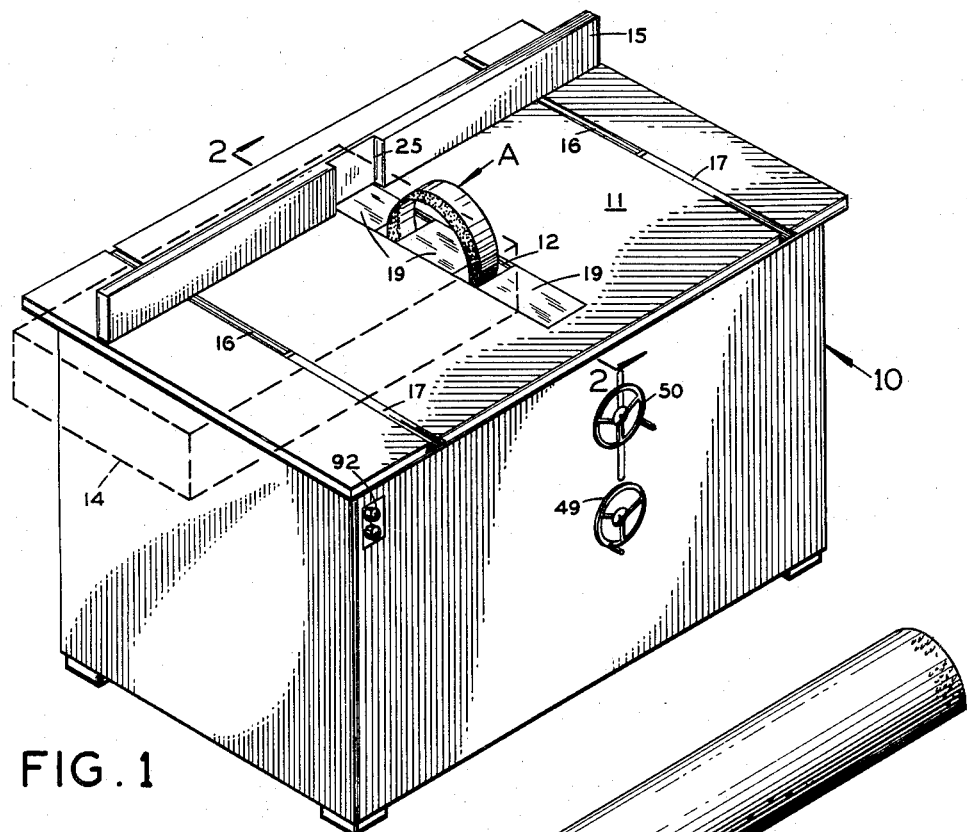
Figure 1 is a perspective view of a pipe insulation cutting machine constructed in accordance with my invention.

Referring to the drawings wherein like numerals are used to designate similar parts throughout the several views, the numeral 10 refers to my pipe insulation cutting machine consisting of a cabinet in which is housed the equipment that constitutes my invention with a table top 11 positioned about waist high in order to permit an operator to operate the machine 10 with comfort. The table top 11 is provided at its mid-portion with an elongated slot 12 to permit a cylindrical cutter A to extend therethrough from within the cabinet. In the normal operation of the machine 10, the cutter A extends approximately equally above and below the table top 11 so that a semicircular cut is made in a block of insulation 14 shown by dotted lines in Figure 1. The block of insulation 14 is placed lengthwise against a guide member 15 and on the table top 11 on the left side of the table top 11 as viewed in Figure 1. This block of insulation 14 is then pushed and made to slide to the right side against the cutter A which is now rotating rapidly as is explained in detail hereinafter to cut along the full length of the block of insulation 14. After numerous cuts by cutters A of different diameters semi-cylindrical pipe covering of any desired pipe size and of any desired thickness may be produced with very little waste or loss of material (see Figure 12). To accommodate blocks of insulation of different sizes, the guide 15 is made adjustable having wedge-shaped members 16 secured to the base of the guide 15 and slidably mounted in under-cut slots 17 in the table top 11. Locking bolts (not shown) are used for securing the guide bar 15 when in position. In order to permit positioning the guide bar 15 as close as possible to the rapidly rotating cutter A without contacting and thereby interfere with the cutter A, a recess 25 is formed in the guide bar 15 in alignment with the cutter A. Also, the edges of the table top 11 forming the recess 12 are rabbeted as at 18 to form a support for plate members 19 which extend across the recess 12 within and outside the confines of cutter A. The plate members 19 permit the insulation block 14 being cut to slide smoothly along the table top 11 through the cutter A. Also, the plate members 19 render an exhaust blower system more effectively which is described hereinafter and is necessary to the proper operation of the machine 10.

Figure 10:
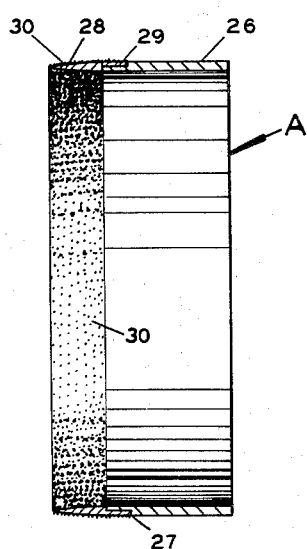
Figure 10 is a cross sectional view taken along the line 10—10 of Figure 9.
Figure 9:
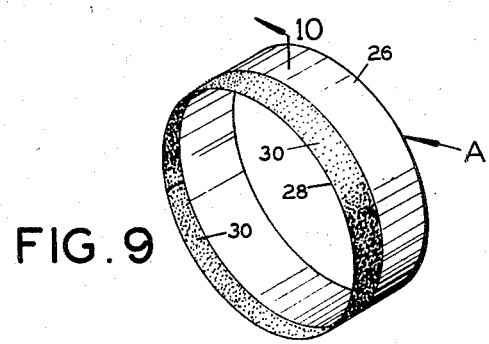
Figure 9 is a perspective view of a cutter.

As best shown by Figures 9 and 10, the cutter A consists of a relatively short length of a cylindrical metallic body member 26 one edge of which is rabbeted as at 27 to receive a cutting tip 28 having a mutually rabbeted edge 29 force fitted on the edge 27 of the body member 26. The cutting tip 28 is tapered to a knife-like edge at its free end and has particles of an abrasive material 30 such as aluminum oxide adhesively secured to both the outside and inside of the cutting tip 28, as best shown by Figure 10. When the cutting tips 28 become worn, they are readily removed from the body member 28 of the cutter A and a new cutting tip 28 replaced thereon.

The cutter A is caused to be rotated and supported by a plurality of rollers 33 and 34 adjustably mounted within the cabinet below and above the table top 11. The pair of rollers 33 are symmetrically disposed with relation to the cutter A and are in contact with the outer surface of the cutter A while the roller 34 extends within the confines of the cutter A in contact with the inner surface thereof. By virtue of the rollers 33 and 34, whose positions may be adjusted to suit cutters of different sizes, the cutter A will cut accurately and with ease and also is readily removed and replaced by other cutters of different sizes with no difficulty whatsoever.

The rollers 33 and 34 are supported on a vertically adjustable carriage B consisting of a body portion 35 having a central disposed depending portion 36 telescopically mounted within a cylinder 37. The cylinder 37 is supported by a plurality of cross members 38 secured to the sides of the cabinet constituting the machine 10 and is provided with a centrally disposed bore 39 through which a shaft end 41 of a screw 40 extends. Secured to the free end of the depending member 36 is a threaded head 42 threadedly mounted on the screw 40 so that upon the rotation of the screw 40 the carriage B will move upwardly or downwardly as desired. A thrust bearing 43 mounted about the shaft 41 absorbs the downward thrust of the carriage B while a bearing 44 maintains the screw 40 centrally in the depending member 36.

At the free end of the screw shaft 41 is a bevel gear 45 in mesh engagement with a second bevel gear 46 secured to one end of a shaft 47. The shaft 47 supported by a bracket 48 which hangs downwardly from the cross member 37 extends outwardly of the cabinet where there is attached an adjustment wheel or handle 49 for raising and lowering the carriage B.

Mounted directly above the adjustment wheel 49 is a second adjustment wheel 50 attached to the outer end of a screw shaft as at 51. The screw shaft is provided at its mid-portion with a collar 52 with right and left handed threaded portions 53 and 54 extending on either side thereof with the free end 55 and the outer end 51 rotatably mounted in block members 56 and 57 respectively secured to the body member 35. On each side of the collar 52 as an axis and at equal distances therefrom there is a base member 58 of U-shaped roller supports 59 on which the rollers 33 are mounted. The base members 58 are threaded as at 60 to receive the left and right handed threaded portions 53 and 54 so that upon turning the adjustment handle 50, the base members 58 and the roller support members 59, 59 as well as the rollers 33, 33 will move equal distance horizontally apart or in a direction toward each other. A guide rod 70 mounted on each side of the screw shaft 51 have their ends secured to the block members 56, 57 and extend through bores 71 in the base members 58, 58 thereby providing a guide for the roller support members 59, 59 as the latter which carry the rollers 33 move horizontally toward and away from each other.

Figure 2:
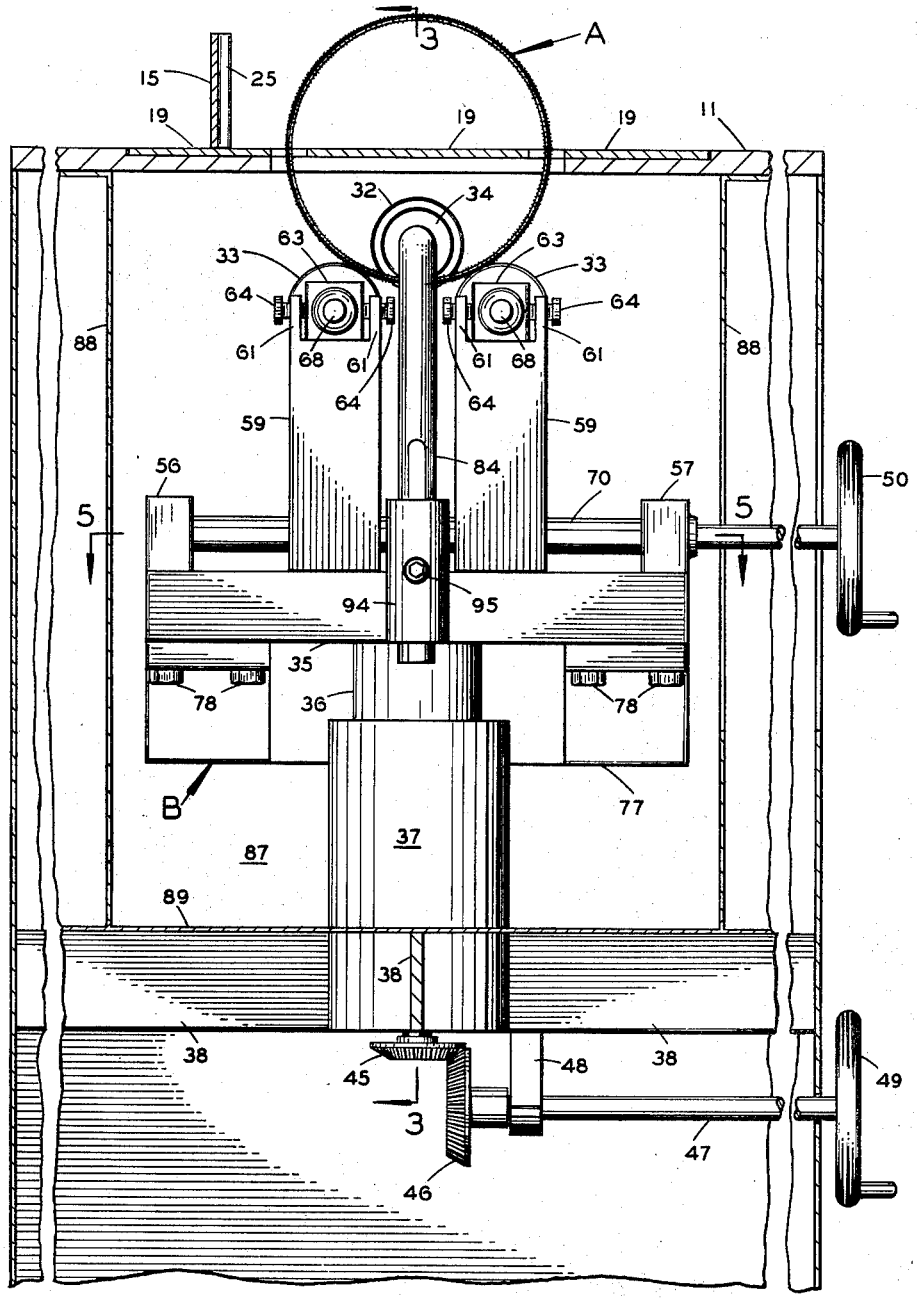
Figure 2 is an enlarged sectional view taken along the line 2—2 of Figure 1.

The roller support members 59 (see Figures 2 and 8) each terminate at their upper ends in a pair of spaced apart lugs 61 with a groove 62 extending therebetween. A bearing block 63 is positioned on each of the four roller support members 59 between the lugs 61 and held in spaced relation thereto by a pair of adjustment bolts 64 threaded through bores in the lugs 61 and bearing tightly against each side of the bearing blocks 63 which is provided with a guide member 65 slidably mounted in the groove 62. In each of the bearing blocks 63 there is mounted a bearing cage 66 containing a plurality roller bearing 67 and which receives the end of the roller shaft 68. The rollers 33 are mounted on the shafts 68. The adjustment bolts 64 permit the positioning of the axes of the roller shafts 68 in a horizontal plane but out of parallel alignment so that the free ends of the roller shafts 68 (the left ends as viewed in Figure 3) are slightly toed-in toward each other. The reason for this will become apparent hereinafter. The powered ends of the roller shafts 68 are each provided with a pulley 72 engaged by an endless belt 73 whose lower end engages a double pulley 74 mounted on the end of a shaft 75 of an electric motor 76. The electric motor 76 rests on a shelf 77 that is secured by bolts 78 to the carriage B so as to move in unison with the rollers 33 and pulleys 72 whereby the pulleys 72, 74 and the belts 73 remain in adjustment for all vertical movements of the carriage. Means are provided for adjusting the position of the motor 76 upon the lateral or horizontal movement of the rollers 68, which movement will change the distance between the pulleys 72 and 74, comprising a plate member 79 secured to the bottom of the motor 76 and provided with a plurality of depending pins 80 extending through bores 81 in the motor support shelf 77. The pins 80 are secured in the bores 81 by set screws or bolts 82 and consequently the motor 76 may be adjusted with relation to the shelf 77. It has been found that when the rollers 33, 33 are as close together as possible, the motor 76 will be approximately resting on the shelf 77 and when the rollers 33, 33 at their extreme position away from each other, the motor 76 will be at its highest position above the shelf 77.

The upper roller 34 which engages the inner surface of the cutter 13 is rotatably mounted on a shaft 83 which extends along the axis of the machine 10 with its ends secured to upright support members 84, 84 whose lower ends are received by an opening 85 in sleeve-like members 94 mounted on each side of the carriage body 35. A set screw 95 locks each of the upright support members at any adjusted position of the roller 34 that is desired. The roller 34 is provided with a thrust bearing 32 of greater diameter than the roller 34 to provide a stop or shoulder for the cutter A as the latter rotates during its cutting operation.

Figure 11:
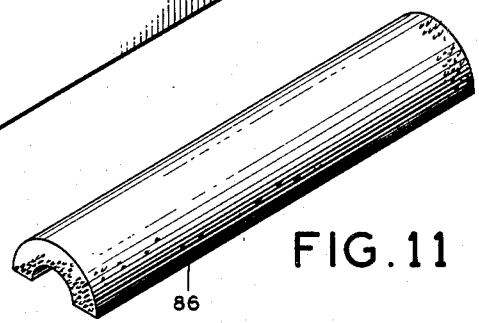
Figure 11 is a perspective view of a pipe insulation cover as produced by my machine and ready to be installed on a pipe to be insulated.

The rollers 33 and 34 are made preferably of resilient material such as rubber and the like for the purpose of frictionally engaging the surfaces of the cutter A to rotate the latter as well as maintain it in a relatively fixed cutting position with relation to the block of material being cut thereby producing an accurate cut. Figure 11 shows a pipe cover 86, the product of the applicant's machine 10, that is ready to be applied to a pipe for the purpose of insulating same. Two such pipe covers 86 are placed about the pipe being insulated, one pipe cover 86 above the other with the sides of the pipe covers 86 cemented together.

Figure 6:
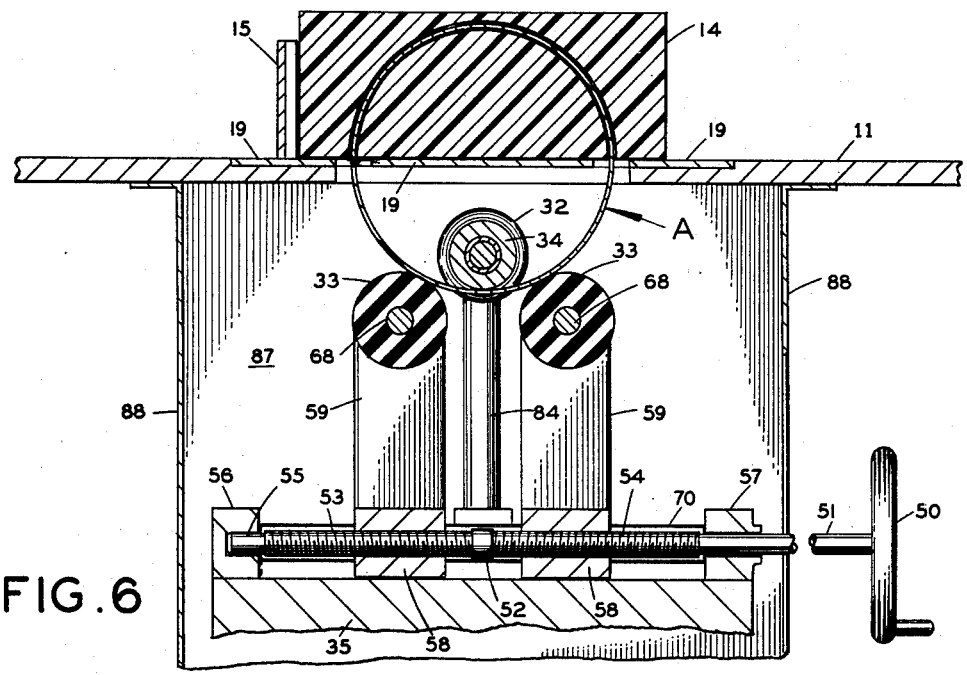
Figure 6 is a cross sectional view taken along the line 6—6 of Figure 3 showing the cutter making the first cut in a block of insulation.
Figure 7:
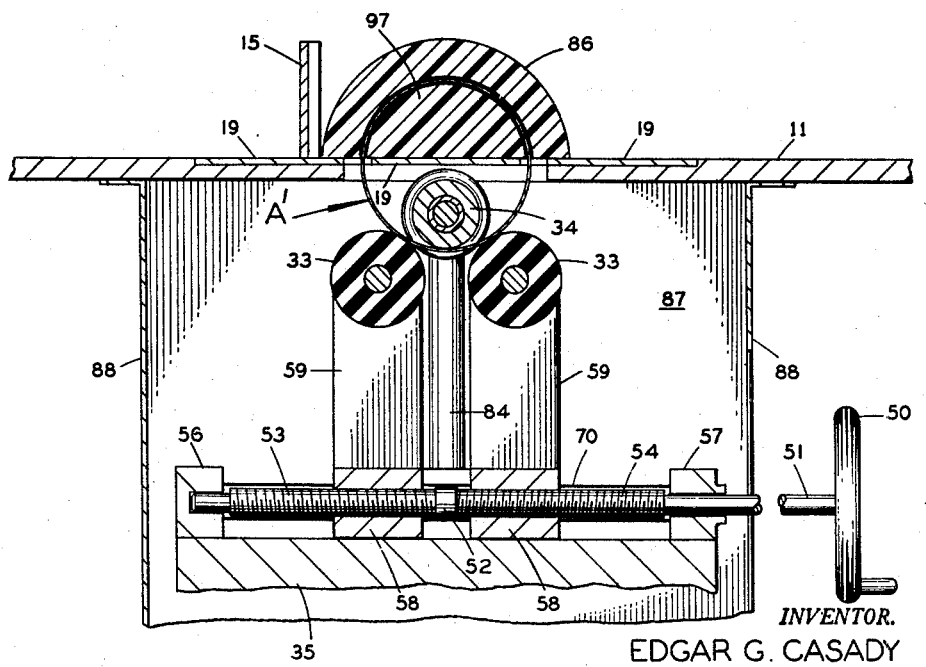
Figure 7 is a similar view showing my machine making a second cut after a smaller cutter has been installed and its rollers appropriately adjusted.

As best shown by Figure 12, a block of insulation material of which there are many, such as foamglass, cork, fiberglass and other plastic materials, may be cut to form many different sizes of pipe coverings with a minimum of waste or unusable material. This is done merely by changing the cutters A used on the machine and adjusting the positions of the rollers 33 and 34. As an example, the insulation block 14 which is rectangular in shape is cut by cutter A and cutter A' as shown by Figures 6 and 7 respectively to form the pipe covering 86. Two progressively smaller cutters similar to the aforementioned cutters are used to make the remaining cuts to form pipe covering 97 and 98. It is readily noted that the amount of material lost as cuttings and other waste is reduced to a minimum.

An enclosed chamber 87 is formed in the machine 10 by side panels 88 and bottom panel 89 to enclose the working mechanisms hereinabove described. In one of the side panels 88 there is an opening 90 connected by a duct 91 which extends to the outer wall of the cabinet where a suction blower (not shown) is mounted for the purpose of withdrawing all particles of material resulting from the cutting operation.

In the normal operation of the pipe insulation cutting machine 10, the proper size cutter A must first be installed and the existing cutter removed from the machine 10. This is done by lifting the cover plate members 19 from the openings 12 on the table top 11. The table top 11 which is hinged to the cabinet, is swung upwardly to expose the machinery contained therein. The set screws 95 are then loosened and the upright members or standard 84, 84 is removed therefrom by pulling upwardly away from the carriage body 35. At the same time the cutter A and roller 34 are removed from the machine 10. A new cutter A of desired diameter is replaced about the roller 34 with one edge thereof abutting against the stop 32 and the standard 84, 84 is returned to its position in the machine 10 with the set screws 86, 86 for the moment left loosened. Then the motor securing set screws 82 are loosened to permit vertical movement of the electric motor 76. The hand wheel 50 is then rotated to adjust the position of the lower rollers 33. If the cutter A being used is large then the rollers 33 are made to move in a direction away from each other to a position where they support the cutter A as shown. It has been noted that radii extending from the axis of the cutter 13 and extended through the axis of the rollers 33 form a central angle of approximately 60 degrees. However, this angle will vary according to the diameter of the cutter A, it only being necessary that the lower rollers 33 be positioned below the cutter 13 and support the latter as the cutter A must rest on the rollers 33. Now, the set screws 82 are tightened with the electric motor 76 in its proper position determined by the tension on the endless belts 73, a slight pressure is now applied downwardly on the roller 34 to cause the latter and the rollers 33 to engage the cutter 13 rather firmly. The set screws 95 are now tightened and the table top 11 swung downwardly to its closed and horizontal position.

Figure 4:
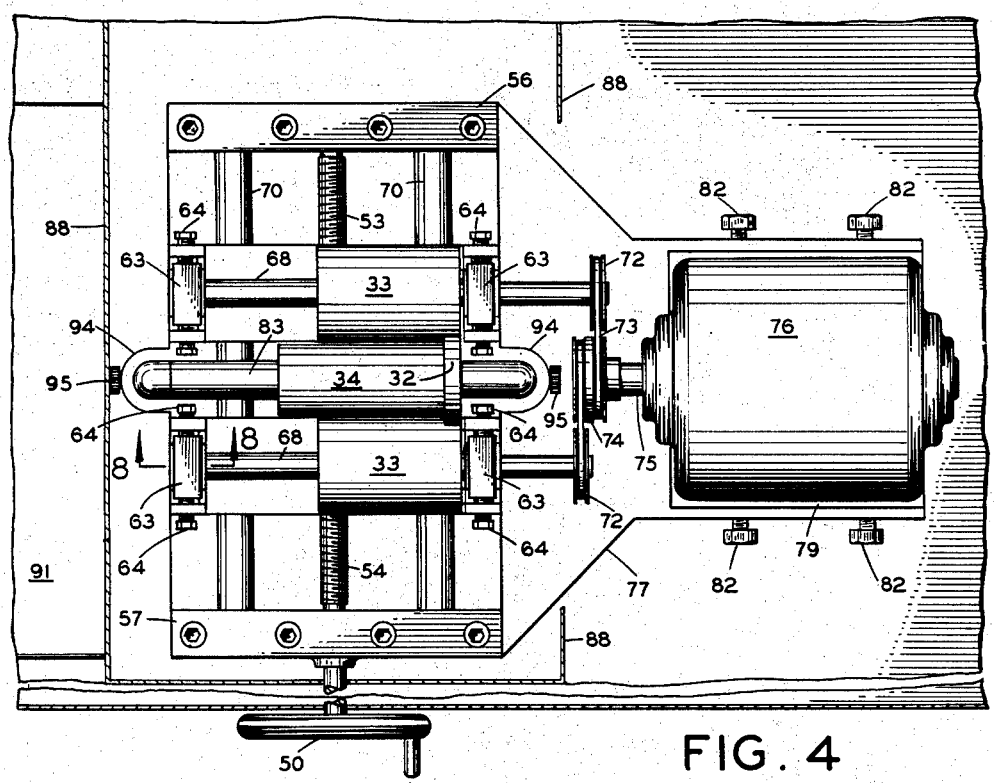
Figure 4 is a fragmentary top plan view of my pipe insulation cutting machine as seen with its table top and cutter removed.
Figure 5:
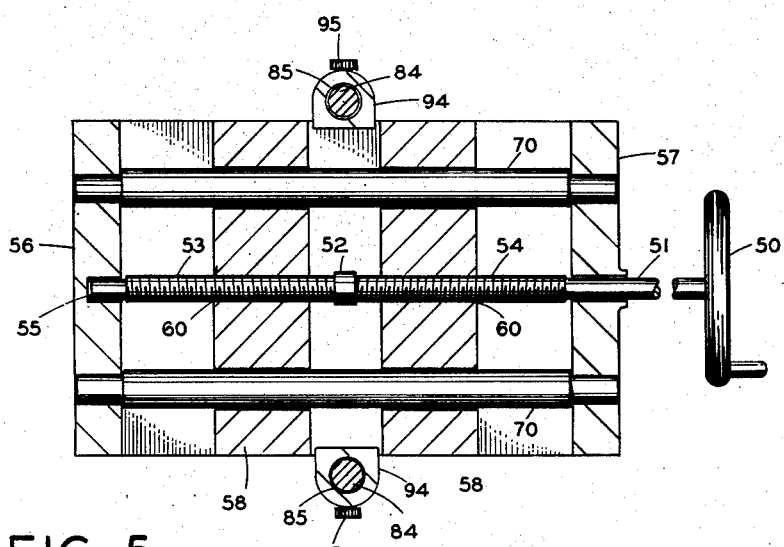
Figure 5 is a sectional view taken along the line 5—5 of Figure 2.

The hand wheel 49 is now rotated to raise or lower the entire carriage assembly B. This moves the cutter A vertically with relation to the table top 11. The cutter A will be at its proper cutting position when exactly one-half of the cutter A is above the top surface of the table top 11. The three cover plates 19 are replaced in the slot 12. The cover plates 19 are spaced from the cutter 13 in order to permit air to leak therethrough, which air picks up the particles of cut and abraded material and are suctioned off together by the blower through the vent duct 91 away from the mechanism of the machine 10. Blocks 14 of any length may be cut by the machine 10. Upon energizing the motor 76 by a switch 92 mounted on the front panel of the cabinet, the rollers 33 will rotate causing the roller 34 and the cutter A to revolve. The cutter A tends to slide rearwardly against the stop 86 because the rollers 33 are slightly out of parallel alignment but rather have their left end (as viewed in Figure 4) toed-in slightly. This is done by adjusting the two bearing blocks 63 which are on the left so that they are slightly closer together than the two bearing blocks 63 which are on the right side of the machine 10.

What I claim as new and desire to secure by Letters Patent of the United States is:

1. A pipe insulation cutting machine comprising hollow cylindrical cutting means having an axis, roller means mounted substantially parallel with said axis in contact relation with the outside surface of said cylindrical cutting means, further roller means mounted substantially parallel with said axis in contact relation with the inside surface of said cylindrical cutting member for maintaining said cylindrical cutting means in frictional engagement with said first named roller means, all of said roller means lying on the same side of a plane passing through the axis of said hollow cylindrical cutting means and power operated means for rotating said cylindrical cutting means.

2. A pipe insulation cutting machine comprising a carriage, adjustable means mounting said carriage for vertical movement in said machine, a pair of support rollers, adjustable means mounting said support rollers on said carriage, hollow cylindrical cutting means mounted on said rollers, a further roller, adjustable means mounting said further roller in frictional engagement with an inner surface of said hollow cylindrical cutting means, all of said rollers lying on the same side of a plane passing through an axis of said hollow cylindrical cutting means and power operated means for rotating said cylindrical cutting means.

3. A pipe insulation cutting machine comprising a support, a top wall mounted substantially horizontally on said support, said top wall having an opening, a carriage, vertical adjustable means mounting said carriage on said support beneath said top wall, a pair of support rollers, substantially horizontal adjustable means mounting said support rollers on said carriage beneath said opening, hollow cylindrical cutting means mounted on said rollers and extending through said opening in said top wall, a further roller positioned beneath said top wall, vertical adjustable means mounting said further roller in frictional engagement with an inner surface of said hollow cylindrical cutting means, and power operated means for rotating said cylindrical cutting means.

4. A pipe insulation cutting machine comprising a support, a top wall mounted substantially horizontally on said support, said top wall having an opening, a carriage, adjustable means mounting said carriage on said support for vertical movement beneath said top wall, a pair of support rollers, adjustable means mounting said support rollers on said carriage for substantially horizontal movement beneath said opening, hollow cylindrical cutting means mounted on said rollers in substantially longitudinal alignment and extending through said opening above said top wall, a further roller positioned beneath said top wall, adjustable means mounting said further roller in frictional engagement with an inner surface of said hollow cylindrical cutting means, a shoulder portion mounted on one end of said further roller and engaging an edge of said cylindrical cutting means, and power operated means for rotating said cylindrical cutting means.

5. A pipe insulation cutting machine comprising a support, a top wall mounted substantially horizontally on said support, said top wall having an opening, a carriage, adjustable means mounting said carriage on said support for vertical movement beneath said top wall, means for operating said adjustable means, a pair of support rollers, adjustable means mounting said support rollers on said carriage for horizontal movement beneath said opening, means for operating said last named adjustable means, a hollow cylinder mounted on said rollers in substantially longitudinal alignment thereto and extending through said opening, said hollow cylinder having an axis lying substantially in the plane of said top wall, cutting means mounted along one edge of said hollow cylinder, a further roller positioned beneath said top wall in substantial alignment with said hollow cylinder, adjustable means mounting said further roller in frictional engagement with an inner surface of said hollow cylinder, a peripheral shoulder portion mounted on one end of said further roller and engaging the other edge of said hollow cylinder and power operated means for rotating said cutting means.

References Cited in the file of this patent

UNITED STATES PATENTS

| | | |
|---|---|---|
| 2,181,547 | Burns | Nov. 28, 1939 |
| 2,424,803 | De Back | July 29, 1947 |
| 2,780,896 | Jaye | Feb. 12, 1957 |